United States Patent
Baechtle et al.

(10) Patent No.: US 7,479,058 B2
(45) Date of Patent: Jan. 20, 2009

(54) METHOD AND DEVICE FOR PORTIONING A STRING OF MATERIAL

(75) Inventors: Manfred Baechtle, Schemmerhofen (DE); Michael Benz, Alberweiler (DE)

(73) Assignee: Albert H. Handtmann Maschinenf Abrik GmbH & Co. KG, Biberach (DE)

( * ) Notice: Subject to any disclaimer, the term of this patent is extended or adjusted under 35 U.S.C. 154(b) by 112 days.

(21) Appl. No.: 11/512,606

(22) Filed: Aug. 30, 2006

(65) Prior Publication Data
US 2007/0082593 A1   Apr. 12, 2007

(30) Foreign Application Priority Data
Sep. 23, 2005   (EP) .................................. 05020825

(51) Int. Cl.
*A22C 11/00* (2006.01)
(52) U.S. Cl. ........................................................ 452/51
(58) Field of Classification Search .................. 452/21, 452/22, 29, 30–35, 37–39, 46–51
See application file for complete search history.

(56) References Cited

U.S. PATENT DOCUMENTS

| | | | |
|---|---|---|---|
| 3,646,637 A * | 3/1972 | Berendt et al. | 452/31 |
| 3,835,503 A * | 9/1974 | Townsend et al. | 452/38 |
| 4,418,447 A | 12/1983 | Ziolko | |
| 4,614,005 A | 9/1986 | Townsend | |
| 6,135,869 A * | 10/2000 | Schutz | 452/32 |
| 7,140,958 B2 * | 11/2006 | Reutter et al. | 452/51 |

FOREIGN PATENT DOCUMENTS

| | | |
|---|---|---|
| EP | 0 392 083 A1 | 10/1990 |
| EP | 0 472 825 A1 | 3/1992 |
| EP | 1 112 691 A1 | 7/2001 |
| WO | WO-03/030646 A1 | 4/2003 |

* cited by examiner

*Primary Examiner*—Thomas Price
(74) *Attorney, Agent, or Firm*—Marshall, Gerstein & Borun LLP (57) ABSTRACT

A device (3) for portioning a string of material (2) moving in the conveying direction (F), particularly a string of sausage, into individual sections (2a) of a predetermined length, including at least one portioning tool (18, 18a, 18b, 19, 19a, 19b, 119a, 119b), which is movable in a circular path around an axis in a manner that it can be moved transversely with respect to the conveying direction (F) into the string of material (2) and out of the string of material and follows the movement of the conveying direction (F) in a limited manner. The portioning tool is rotatable on a circular path around a first axis (20, 21) and on a second circular path around a second axis (16), wherein the axes (16, 20, 21) are arranged at a distance with respect to one another and the rotary movements around the first and around the second axis (16, and 20, 21, respectively) are formed in a manner controllable independent of one another. A plurality of portioning tools are arranged on a carrier (15), wherein the carrier (15) or the portioning tools are rotable around the axis (16, 20, 21).

11 Claims, 7 Drawing Sheets

Fig.7

METHOD AND DEVICE FOR PORTIONING A STRING OF MATERIAL

CROSS-REFERENCE TO RELATED APPLICATION

The present application claims the benefit of priority of European Patent Application No. 05020825.5 filed on Sep. 23, 2005. The entire text of the priority application is incorporated herein by reference in its entirety.

FIELD OF THE DISCLOSURE

The disclosure refers to a device and a method of portioning a string of material, such as used in sausage making operations.

BACKGROUND OF THE INVENTION

Such a device and such a method are known from EP 392 083 and EP 472 825, respectively. The known device comprises a portioning element, which is formed for displacing material from the string of material, so that a reduction in diameter results at this point, said reduction in diameter dividing the string of material into individual sections of a predetermined length, in which said reduction in diameter the twist-off portion for dividing the string of material, for instance into individual sausages, is formed. The portioning element is formed in a manner similar to a flag, i.e. it's one free end is connected to an axis of rotation, whereas the other free end comprises a forming tool for forming a diameter constriction. The portioning element is arranged adjacent to the string of material ejected from a filling machine and moving linearly, wherein the axis of rotation extends perpendicular with respect to the conveying direction of the string of material. The portioning element is driven in a suitable, controlled manner in a way that it moves from a starting position at the predetermined portion into the string of material and after generating the diameter reduction it withdraws from the string of material. The speed of rotation of the portioning element is adapted to the conveying speed of the string of material such that the velocity of circulation of the portioning element when producing the diameter reduction substantially corresponds to the conveying speed of the string of material. If the portioning element has twisted to such an extent that it is withdrawn from the string of material again, it may be provided that the speed of rotation of the portioning element is decelerated or accelerated until reaching the starting position for a new diameter reduction, so that in this manner the length of the sections to be divided can be changed. However, a minimum length is constructively predetermined, which corresponds at least to the distance between the tool and the axis of the portioning element, since the portioning element must always rotate in a manner aligned radially with respect to the axis of rotation. Moreover, the path in which the portioning element may follow the conveying movement of the string of material, is very limited. For sensitive strings of material, for instance strings of material with a coextruded sleeve, which must cure before it can be loaded to a greater extent, this device is less suitable.

A further device for portioning a string of material is known from WO 03/030646, by means of which the string of material shall be dividable variably and synchronously with the rate of extrusion of the string of material. This device includes a portioning element, which is guided on a reciprocating movement path. The drive of the portioning element is formed as a type of connecting rod drive, wherein, however, the drive is carried out via the crankshaft. The crankshaft is driven via a relatively complex gearing and in turn drives a second crankshaft, which is also connected to the portioning element and which takes care that the portioning element basically remains perpendicular with respect to the string of material. It is also described that the drive of the portioning element may have different speeds so that the length of the sections to be portioned can be changed. Caused by the high constructive effort for the transmission, however, a relatively high mass acceleration must be employed, which requires a high drive power.

The common disadvantage of all known portioning devices is, however, their relative limitation to the previously defined operation method.

SUMMARY OF THE DISCLOSURE

Thus, it is the object of the disclosure to provide a portioning device, which can be used universally for different tasks, and which is particularly capable of also portioning short sections.

By the design according to the disclosure, the device can be easily adapted in a simple manner to various objects, be this by the possibility of being able to rotate the portioning tool around two axes arranged at a distance with respect to each other and controllable independent of one another, be this by the possibility of operating several portioning tools. In both cases is it possible to portion very small sections also at high transport speeds.

It is especially advantageous that by the device according to the disclosure the sections can be portioned by constriction as well as by separation as well as by constriction and separation, in that either a displacement element and/or a separation element can be used as positioning tool, wherein both types of tools can be moved and driven in the same manner.

If the portioning tools are exchangeable, an even greater variety of operations results to which the device according to the invention can be adapted.

In a constructively especially simple embodiment, the device according to the disclosure comprises a rotary disk, which is rotatable around its axis and which carries a plurality of positioning tools, which are arranged at predetermined angular distances on the rotary disk and which are rotatable around their own axis.

BRIEF DESCRIPTION OF THE DRAWINGS

Embodiments of the disclosure will now be explained in detail by the aid of the drawings.

DETAILED DESCRIPTION OF THE DISCLOSURE

Figure 1:
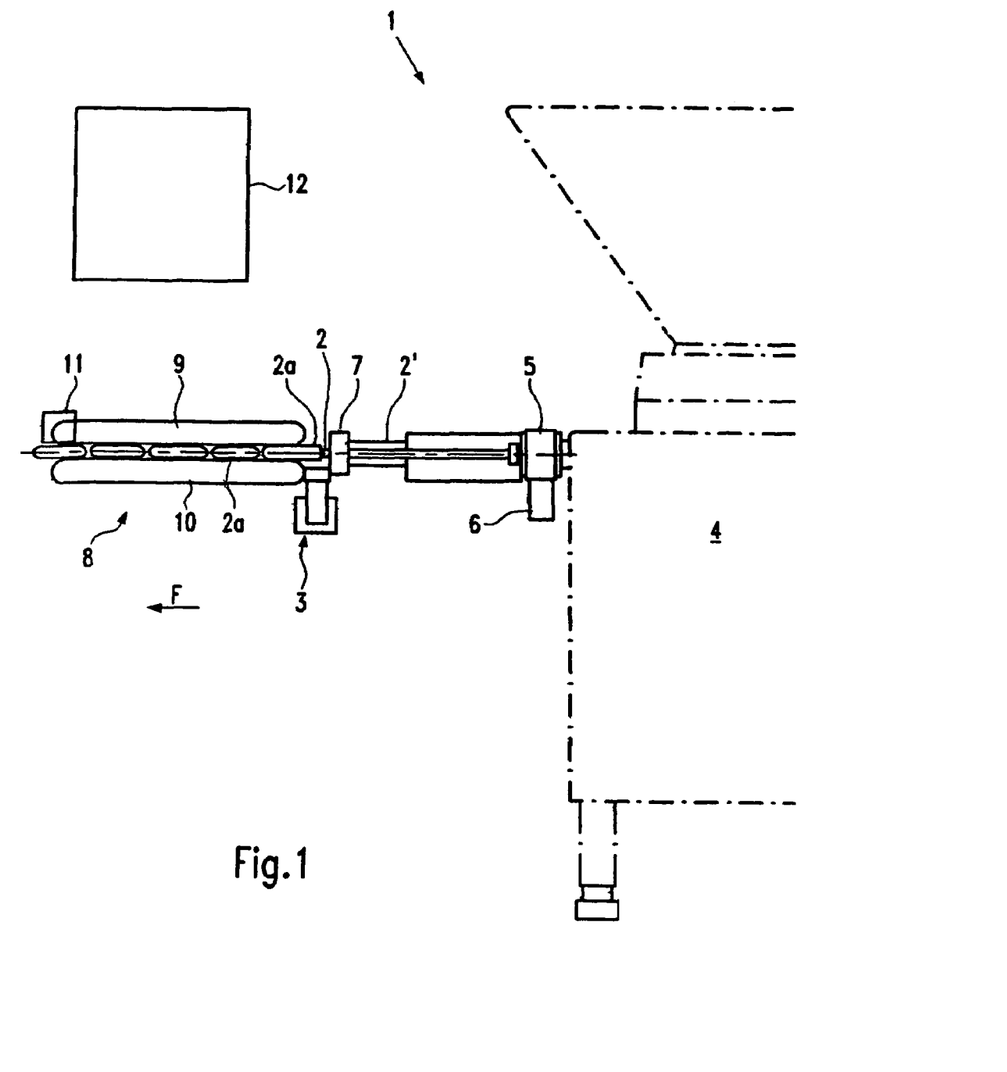
FIG. 1 shows a schematic side view of an extrusion machine provided with the device according to the disclosure.

FIG. 1 shows in schematic view an extrusion machine 1 for generating an extruded string of material 2, which by the aid of at least one portioning device 3 is divided into individual sections 2a. In the embodiment shown, the extrusion machine 1 is adapted to the needs of the food industry and is particular one of the conventional sausage machines, which extrudes sausage meat in a strand-like manner, packs it into a sleeve and subsequently divides it into individual sausages by the aid of the portioning device 3 according to the invention.

Except for the portioning device according to the disclosure, the extrusion machine 1 is of conventional kind, and is particularly formed in a manner as described in EP 392 083.

The extrusion machine 1 includes a filling machine 4 shown in dash and dot line, which extrudes the string of material 2. For forming the individual sections 2a, these sections are extruded in a sleeve and are twisted off. The sleeve may be a natural or an artificial sausage casing, however, it may also be a co-extruded sleeve, which is extruded together with the string of material 2 and which must cure on the string of material 2. For twisting off the sleeve between the sections 2a, a twist-off transmission 5 is provided, which is driven by an electromotor 6. The string of material 2 is extruded through a central opening of a brake ring 7, which causes the string of material 2 to be rotated around its axis 2'. If the string of material 2 is provided with a sleeve, this sleeve is co-rotated.

The conveying means 8 is provided in the conveying direction F downstream the brake ring 7, said conveying means having two endless conveying belts 9 and 10, which engage on two opposing sides of the string of material 2 and which determine the draw-off speed in the conveying direction F of the string of material 2 from the brake ring 7 synchronously with the filling material ejection. The conveying speed is for instance approx. 2 m/sec. The conveying belts 9, 10 are driven synchronously by means of an electromotor 11. Furthermore, a control 12 is provided, through which the components of the device 1 are controlled.

The device 1 operates as follows. The string of material 2 is set into rotation by the twist-off transmission 5, wherein the sleeve also rotates, and is further extruded to such an extent that it reaches the area of the conveying means 8 and is caught by the endless conveyor 9, 10. Thus, the rotation of the string of material 2 is stopped and thus loaded for torsion, wherein the portioning means 3 starts to become active, i.e. generates particularly a diameter constriction. At this diameter constriction the sleeve is then twisted in a manner that the individual sections 2a of the string of material are separated from one another by the twisted-off portions of the sleeve. The sections 2a can also be separated from one another at the twisted-off portions.

The above-mentioned components of the device and their effectiveness correspond to the components and the effectiveness of conventional sausage machines.

However, it is possible by the portioning device 3 according to the disclosure, besides the pure twist-off of the sections 2a from the string of material, which is covered by natural or artificial sausage casing, to also portion sections 2a from a string of material 2 with a coextruded sleeve, while the sleeve is still curing. It is also possible by the portioning device 3 according to the disclosure to separate a twisted-off string of material 2 between the individual sections 2a. Finally, it is also possible by the portioning device 3 according to the disclosure to separate a string of material 2, with or without a sleeve, without a twist-off process, into the individual sections 2a.

This may be achieved by portioning devices, as they are shown in FIGS. 2 to 7.

Figure 2:
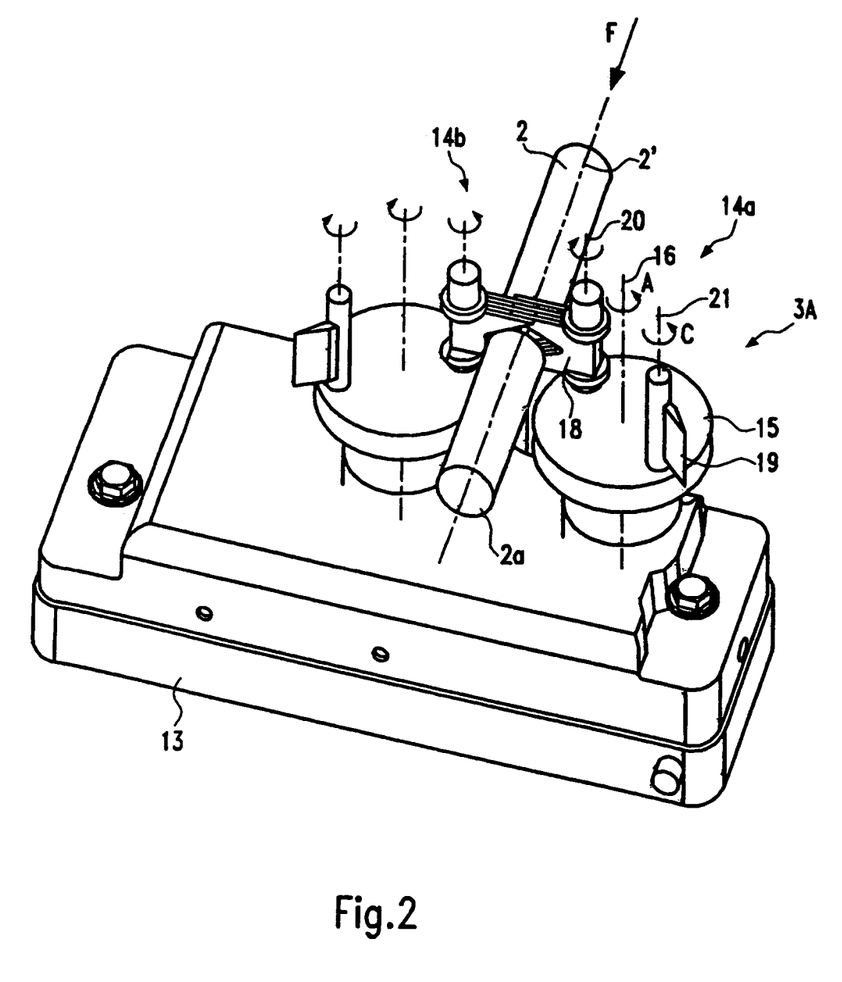
FIG. 2 is an enlarged, perspective view of the device according to the disclosure in a first embodiment.

FIG. 2 shows a first embodiment 3A of the device 3 according to the disclosure for portioning a string of material 2. The device 3A includes a housing 13, in which a drive in the form of an electromotor and a transmission are stored in a manner safe against soiling.

Two portioning units 14a, 14b are arranged on the upper side of the housing 13, which are arranged symmetrical and on both sides of the string of material 2. Both units 14a, 14b are formed identically, however they are arranged laterally reversed so that only one of the units must be described.

Each of the units 14a, 14b has a carrier, which in the embodiment shown is formed as a rotary disk. The carrier 15 can be rotated around a first axis 16 in the direction towards the arrow A, said axis extending transversely with respect to the axis 2' of the string of material and said axis preferably being perpendicular. The direction of rotation A is chosen such that the carrier 15 on the string of material 2 rotates in the conveying direction F.

At least one portioning tool is arranged on the carrier 15, wherein two portioning tools 18, 19 are shown. The portioning tools 18 and 19 together with the carrier 15 are rotatable around the axis 16 in a circular path and additionally around a second axis 20 and 21, respectively in a further circular path. The axes 20 and 21, respectively, are spaced apart from the axis 16 and thus from the centerline of the carrier 15 and are arranged preferably in the proximity of the circumference of the rotary disk. Both axes 20, 21 are arranged preferably in parallel to one another and in parallel to the axis 16. In the embodiment shown, the axes 16, 20 and 21 lie on a common plane perpendicularly with respect to the carrier 15, wherein the axes 20 and 21 have an angular distance of approximately 180°. The axes 16, 20 and 21 can be driven independent of one another, wherein preferably the speed of rotation per time unit and/or the rotational speed within one revolution and/or the direction of rotation can be changed if needed.

The portioning element 18 is formed as a displacement element, i.e. it serves for displacing the material in the string 2 at predetermined positions, to portion the string of material 2 into the individual sections 2a. The portioning tool 18 is movable around its axis 20 in a direction of rotation B, which is opposite to the conveying direction F if the portioning tool 18 is at its position close to the string of material 2.

Each of the portioning tools 18 of the two units 14a, 14b formed as displacement elements is formed as a type of double-prong fork with a V-shaped accommodation opening for the string of material, wherein the accommodation openings of both displacement elements 18 approximate one another for forming a diameter-reduced portion in the string of material 2, i.e. for dividing the string of material 2 into the individual sections 2a. This is achieved by a predetermined control of each unit 14a, 14b. The speed of rotation of the carrier 15 and thus the speed of rotation of the displacement element 18 around the axis 16 in the direction of rotation A is adapted to the conveying speed during engagement of the displacement element 18 into the string of material 2 (preferably the same speed or circumferential speed), and outside of the engagement it is adapted to the predetermined length of the individual sections 2a. The rotation of the displacement elements 18 around the axis 20 is controlled such that the displacement element 18 during initial contact with the string of material 2 is aligned substantially at a right angle with respect to the centerline 2' and keeps this alignment by rotation in the direction B, against A, until the diameter reduction is completed and the carrier 15 during its rotation A has withdrawn the displacement element 18 from contact with the string of material 2. In the apex the speed of the portioning element in the conveying direction F is at least approximately equal to the circumferential speed of the axis 20 around the axis 16. Caused by the possibility of rotating the portioning tool 18, in addition to a rotation in the direction of rotation A, also in the direction of rotation B it is further ensured that the portioning tool 18 can follow the movement of the string of material 2 in the conveying direction F over a substantially larger range than this would be possible with a movement of rotation only in the direction of rotation A around the axis 16. The string of material 2 is therefore handled much smoother than this is possible with conventional portioning tools.

The second portioning tool 19 is formed as a separation element by means of which the sections 2a can be separated from one another. The second portioning element 19 is driven rotatably in the direction of rotation C around the axis of rotation 21, wherein the direction of rotation C is preferably chosen such that the movement takes place in the conveying direction if the portioning element 19 is at its greatest approximation to the string of material 2. In this manner it is possible to carry out a separation very quickly and precisely, wherein the portioning elements 19 move along with the string of material 2 when being separated so that one single, defined cutting point results by a cooperation of the separation elements of both units 14, 14b. The direction of rotation of the axis 21 may also be in the counter-direction to C to achieve a long running cut.

The portioning means 3 according to the disclosure can be adapted in a simple manner to different lengths of the sections 2a. This is preferably implemented by a control of the speeds in the directions of rotation A, B and C and possibly by a reversing of the direction of rotation. Extremely short sections 2a for instance may be portioned in that the speed in the direction of rotation A is immediately increased as soon as one of the portioning tools 18, 19, particularly the displacement element 18, has withdrawn from the string of material 2 to such an extent that the remaining path of one full revolution around the axis 16 until re-submerging into the string of material 2 is covered essentially faster than this corresponds to the conveying speed F. After submerging into the string of material 2, the speed may be reduced to a speed of rotation adapted to the conveying speed F. The process may be reversed, i.e. the speed of rotation in the direction of rotation A may be reduced if especially long sections 2a are desired. In order to bring the portioning tools 18, 19 back into their starting position for submerging into the string of material 2, the portioning tools 18, 19 may either be rotated back in reversal of their direction of rotation around the axes 20, 21 about the amount by which they were rotated during their working phase, or they may keep their directions of rotation B, C and complete a full revolution before they submerge into the string of material 2 again.

A further variation possibility results if the portioning tools 18, 19 are arranged in an exchangeable manner on the carrier 15. Then, the separation element may for instance be replaced by a further displacement element, or the displacement element may be exchanged by a further separation element. If two or even more identical portioning tools are attached on a carrier, arbitrarily small sections can be divided off depending on the speed of rotation of the carrier and/or the conveying speed of the string of material, or the portioning process may essentially be accelerated, for instance in the case of relatively insensitive strings of material.

Figure 3:
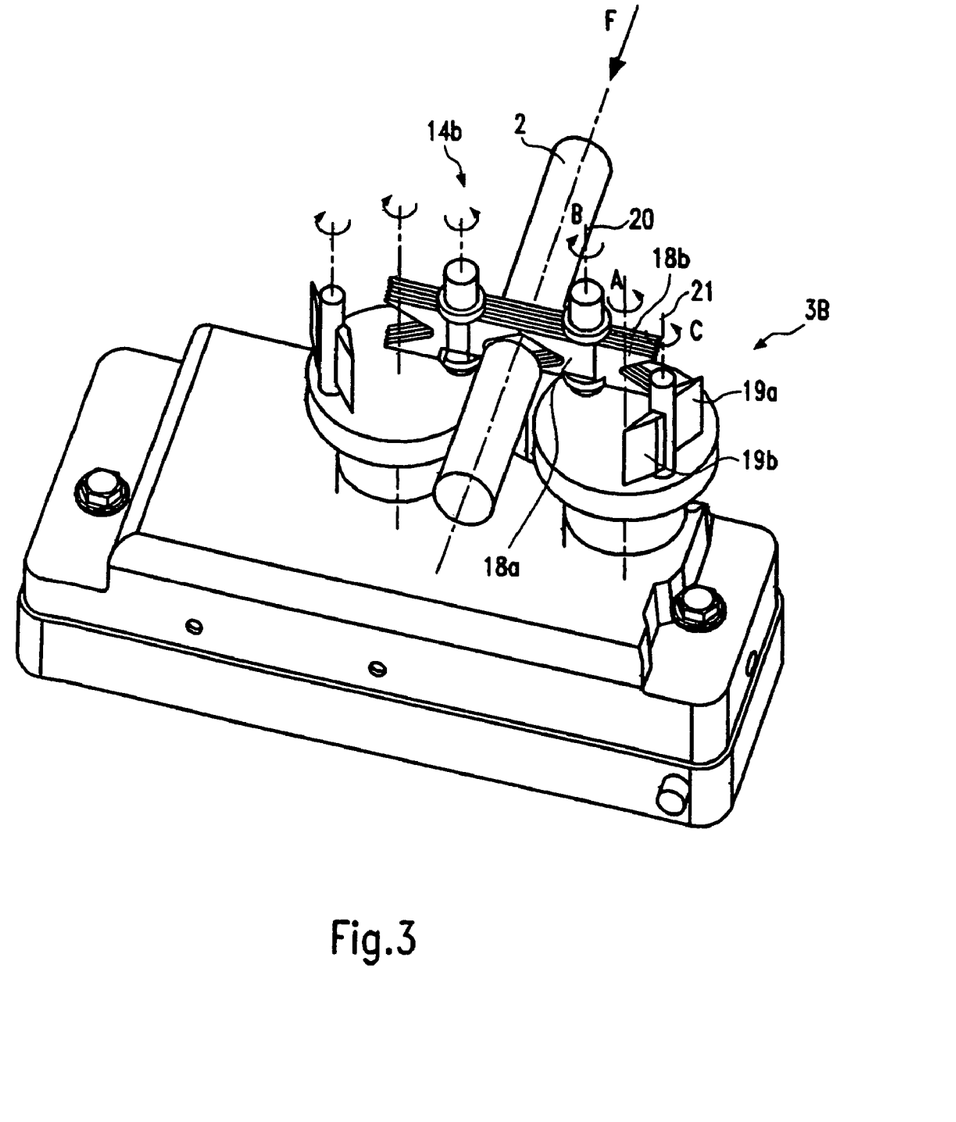
FIG. 3 is an enlarged, perspective view of a further embodiment of the device according to the disclosure.

However, it is also possible, as embodiment 3B of FIG. 3 shows, to arrange a plurality of portioning tools around the same axis 20 and 21, respectively, in a rotatable manner. In the embodiment shown, two portioning tools 18a, 18b formed as displacement elements rotate around the axis 20 in each unit 14a, 14b, and two portioning tools 19a and 19b formed as separation elements rotate around the axis 21. In the embodiment shown, the two portioning elements 18a, 18b are provided for different diameters of strings of material 2 with different opening widths, while the portioning tools 19a, 19b formed as separation elements for separating differently strong strings of material 2 project differently large over the axis 21. The different tools 18a, 18b and 109a, 19b oppose one another diametrically with respect to their axis of rotation 20, 21. The rest of the design of the portioning means corresponds to the embodiment according to FIG. 2 so that reference is made to the respective explanations.

Figure 4:
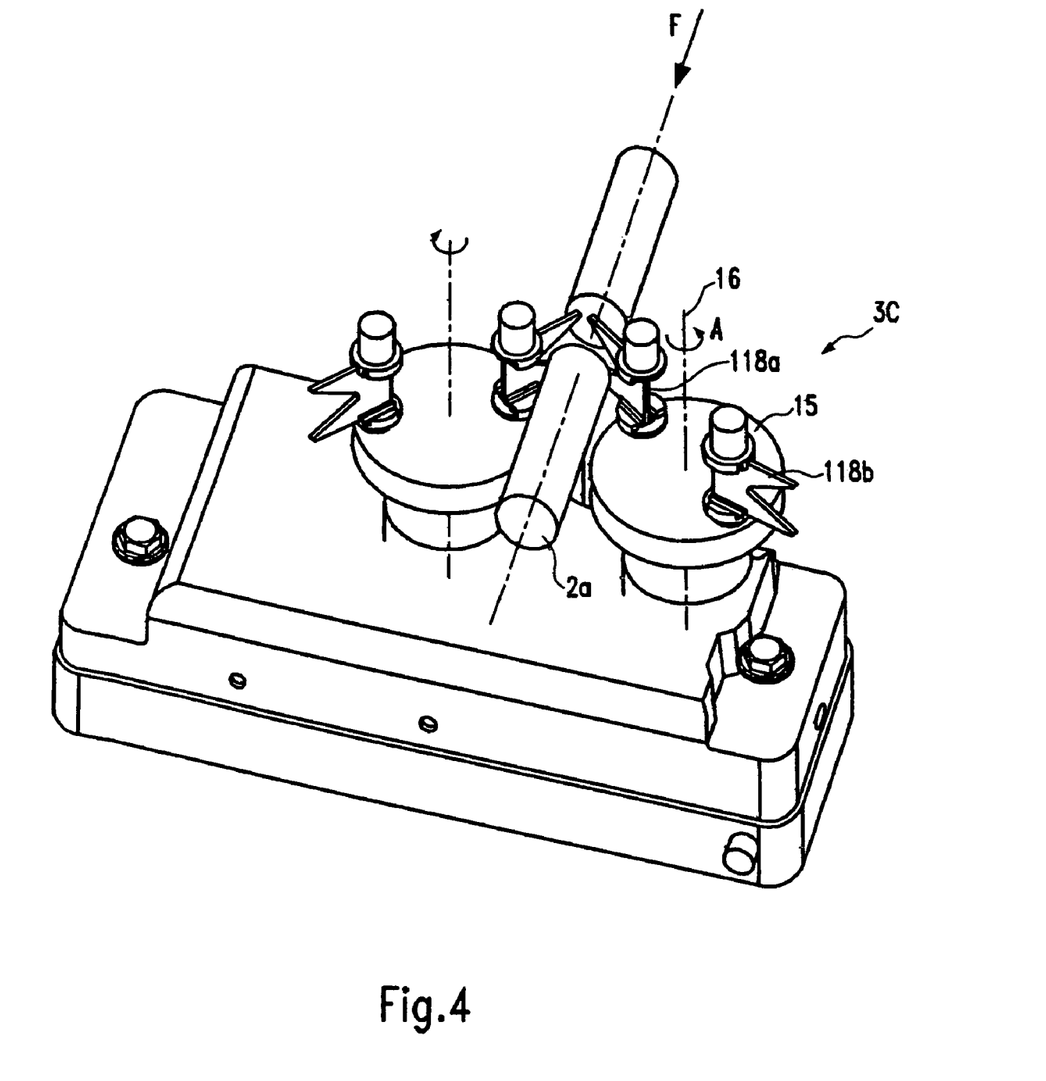
FIG. 4 is an enlarged, perspective view of a further embodiment of a device according to the disclosure.

FIG. 4 shows a further embodiment of a portioning device 3C according to the disclosure, which is particularly formed for the production of relatively short sections 2a. Embodiment 3c includes the carrier 15, which is driven rotatably around its centerline formed as axis 16 in the direction of rotation A. Two portioning tools 118a, 118b are arranged on the carrier 15, whose rotation possibility around their own axis is blocked, wherein they extend substantially radially with respect to the axis 16. The two portioning tools 118a, 118b formed as displacement elements diametrically oppose one another with respect to the axis 16. By this device 3C a diameter reduction can be achieved at each half revolution around the axis of rotation A, wherein different lengths of sections 2a can be set by a respective speed control in the direction of rotation A. The other components of this embodiment correspond to the embodiment according to FIG. 2 and are not explained again.

Figure 5:
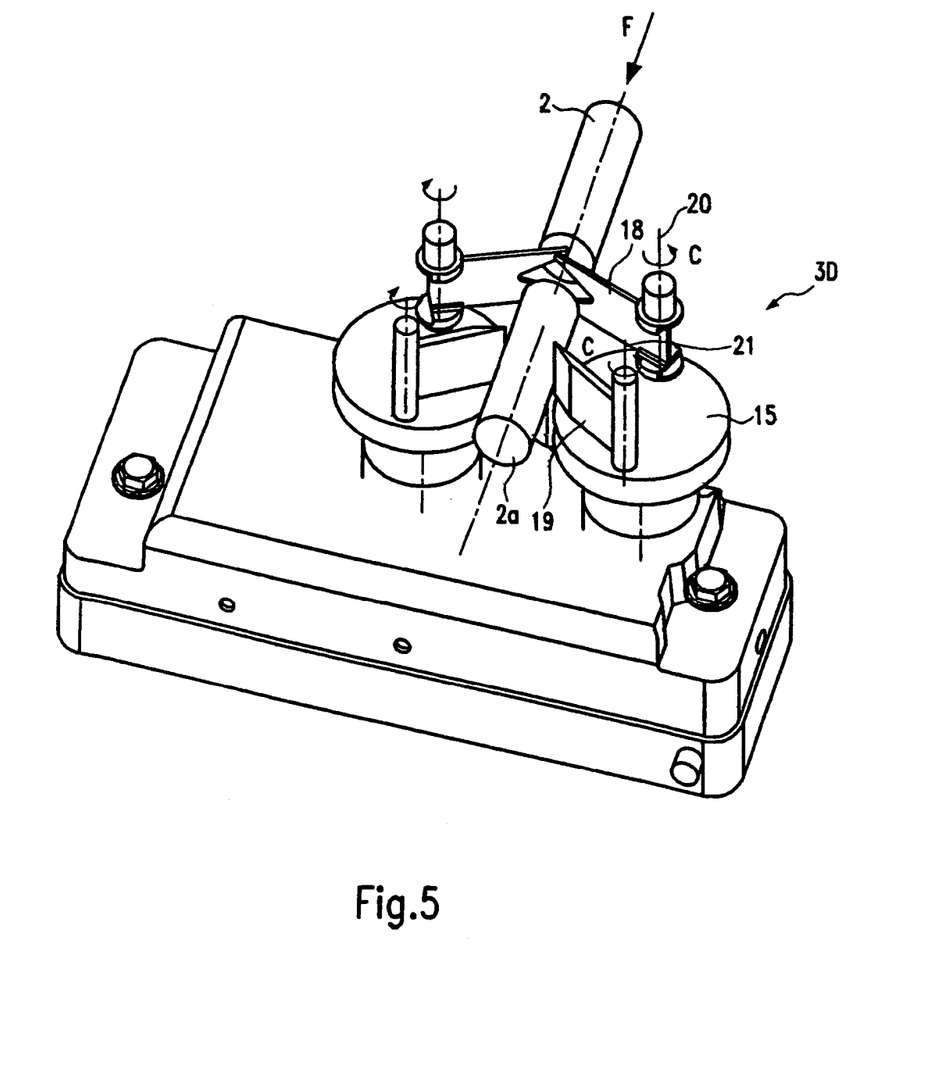
FIG. 5 is an enlarged, perspective view of a further embodiment of the device according to the invention.

FIG. 5 shows a further embodiment 3D, which except for the details that will be described below corresponds to the embodiment according to FIG. 1. In the embodiment 3D the movement of rotation of the carrier 15 is blocked. Two portioning tools 18 and 19, respectively, are arranged on the carrier 15 and these tools are rotatable around their respective axes 20 and 21, respectively, in the direction of rotation C, i.e. the portioning tool 18 formed as displacement element as well as the portioning tool 19 formed as separation element can be moved in the conveying direction F when submerging into the string of material 2, and are therefore guided in the conveying direction F.

The two portioning tools 18, 19 are arranged behind one another in the conveying direction F, and diametrically oppose one another with respect to the rotary disk 16, wherein the portioning tool 18 formed as a displacement element is arranged upstream of the separation element 19. The control of the two portioning tools 18, 19 is carried out in that the displacement elements 18 are moved into the string of material 2 caused by a rotary movement in the direction of rotation C, and generate a diameter reduction there, whereas the separation element 19 is withdrawn from the string of material 2. As soon as the diameter reduction is completed and the displacement elements 18 have withdrawn from the string of material 2, the separation elements 19 of both units submerge at the diameter reduction and separate a section 2a from the string of material 2. To displace the length of sections 2a, the rotary movements around the axes 20, 21 may be controlled such that a return into the starting position takes place at a higher speed than during the working phase of the tools.

Figure 6:
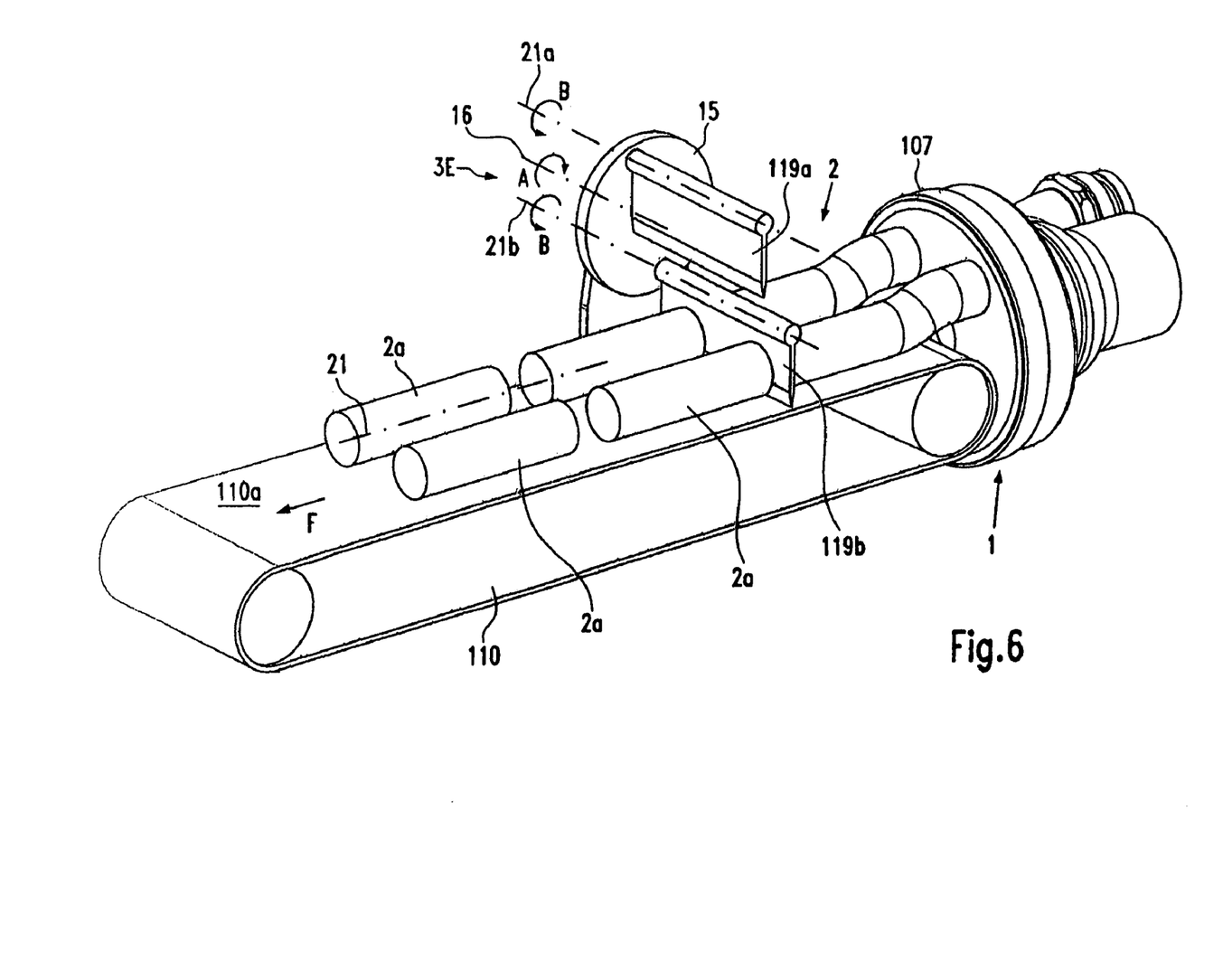
FIG. 6 is an enlarged, perspective view of a further embodiment of the device according to the disclosure.
Figure 7:
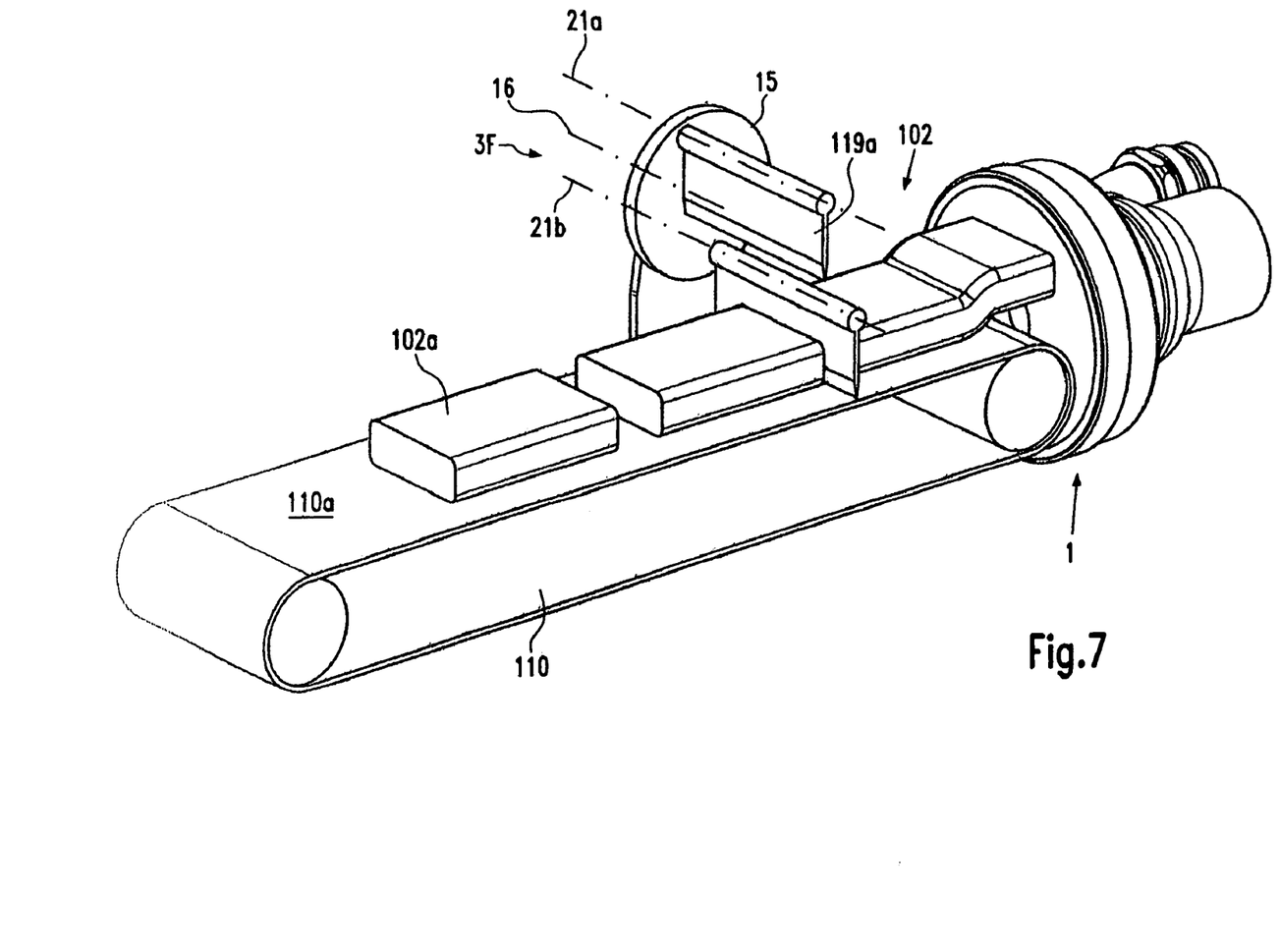
FIG. 7 is an enlarged, perspective view of a further embodiment of the device according to the disclosure.

FIGS. 6 and 7 show two further embodiments of a portioning means 3E and 3F, which are only formed to divide a string of material 2 and not to constrict or twist-off the string of material. The portioning means 3E and 3F may for instance be used for dividing an extruded string of material of chopped meat or another food mass, which at the time of separation or division may be packaged or unpackaged.

In the embodiment according to FIG. 9, the portioning means 3E is used for simultaneously dividing a plurality of parallel strings of material 2 into substantially equally large sections 2a. The strings of material 2 are ejected by an extrusion machine 1, which is similar to the extrusion machine 1 according to FIG. 1, which, however, does not necessarily have to be provided with a device for applying or coextruding a sleeve.

The strings of material 2 are ejected in circular-cylindrical form or sausage form by an extrusion head 107, and are deposited onto a conveyor belt 110, which pulls the extruded strings of material from the extruder head 107, said strings lying horizontally next to each other in the conveying direction F. The conveying means 110 is preferably a belt conveyor or the like, which forms a defined rest surface 110a for the strings of material 2.

The portioning device 3E includes a carrier 15, which in the embodiment shown is rotatably driven around an axis 16, which extends substantially horizontally and again transversely with respect to the longitudinal centerline of the strings of material 2 or with respect o the conveying direction F. The carrier 15 is again preferably formed as a circular disk. Two positioning tools 119a and 119b are arranged on the carrier 15, said portioning tools being rotatable around an axis 21a and 21b, respectively. The axes 21a, 21b are spaced apart from the axis 16, extend in parallel to the axis 16 and are arranged on diametrically opposing sides with respect to the axis 16.

The portioning tools 119a, 119b are both formed as separation tools and are designed such that they simultaneously cut both strings of material 2, wherein the rest surface 110a of the conveyor 110 may serve as a counter-surface.

For cutting the strings of material the carrier 15 is driven in the direction of rotation A, i.e. in a manner that it extends in its greatest proximity to the strings of material 2 in parallel and in the same direction with respect to the conveying direction F. The speed of rotation of the carrier 15 is preferably formed such that a portioning tool currently in engagement with the string of material 2 runs with a speed adapted to the conveying speed and preferably with the same speed as the string of material 2.

During engagement of the portioning tool 119a, 199b, this tool is rotated around the axis 21a, and 21b in the direction of rotation B, which is opposite to the direction of rotation A. The direction of rotation in the direction B is dimensioned such that the portioning tool 119a, and 199b, respectively, maintains the same angle with respect to the longitudinal centerline 2a of the strings of material 2 over the entire period of time of the engagement with the strings of material 2, i.e. from the start to the end of the cut for generating the sections 2a. In the embodiment shown, the portioning tools 119a, 119b are blades with a substantially plate-shaped blade, wherein the speed of rotation in the direction of rotation B is dimensioned such that the blade thereof aligns at the beginning of the cut substantially perpendicular with respect to the support surface 110A, and maintains this alignment during rotation of the carrier 15 until the respective blade has finished the cut and is withdrawn from the string of material 2. In this manner, a very smooth, rectangular cut surface is achieved.

As is also the case in the above-described embodiment, it is also possible with the portioning device 3E to adjust the length of the sections 2a in a simple manner in that the speed of rotation of the carrier 15, particularly between two cuts, is prolonged or shortened. A further possibility for changing the length of the sections 2a is, as also in the above described embodiments, the possibility of reducing or increasing the number of portioning tools provided on the carrier 15 and rotatable around their own axis.

The portioning device 3F according to FIG. 7 differs from the portioning device 3E according to FIG. 6 only by the shape of the extruded string of material 102. This embodiment shows that instead of one or several strings of material with a round cross section one or several strings of material with a rectangular or square cross section can be divided into sections 102 by the portioning device according to the invention without constructive changes of the device, except as on the extrusion head 107, becoming necessary.

In modification of the described and drawn embodiments, the individual features can also be newly combined and/or the designs described by means of the individual embodiments can be exchanged among one another. In the embodiments according to FIGS. 2 and 3 one of the tools could for instance be blocked in rotation. In all embodiments the tools can be arranged in an exchangeable manner on the carrier. Instead of the rotary disk, rotary arms can also be provided. Furthermore, more than two tools per unit can be provided. It is also possible, in deviation to the illustrations of FIGS. 2 and 3, to arrange the same type of portioning tool on a carrier, i.e. displacement elements only, or separation elements only, and to arrange at least one displacement and one separation portioning means in the conveying direction behind one another, if the constriction as well as a separation is desired. Thus, different interval lengths for portioning and separation could better be realized, if e.g. separation shall be performed only behind every second or behind a predetermined number of sections (for chains of sausages etc.)

We claim:

1. A device for portioning a string of material moving in a conveying direction, into individual sections of a predetermined length, comprising at least one portioning tool being rotatable in a circular path around an axis in a manner so that the at least one portioning tool is moved transversely with respect to the conveying direction into the string of material and out of the string of material and that the portioning tool follows the movement in the conveying direction in a limited manner, the portioning tool further being rotatable on a first circular path around a first axis and on a second circular path around a second axis, wherein the first and the second axes are arranged at a distance to one another and the rotary movements around the first and the second axes can be controlled independent of one another, wherein the portioning tool comprises one of a displacement element for displacing the material in the string and a separation element for separating the string into the individual sections.

2. A device as claimed in claim 1, wherein a plurality of portioning tools are provided, each portioning tool being rotatable around their own axis and in predetermined angular distance with respect to one another around a common first axis.

3. A device as claimed in claim 1, wherein the portioning tool with its axis is rotatably arranged on a carrier, and the carrier is rotatable around the first axis.

4. A device as claimed in claim 3, and a plurality of portioning tools are provided on the carrier.

5. A device as claimed in claim 1, wherein the portioning tool is exchangeable.

6. A device as claimed in claim 1, wherein a plurality of portioning tools are rotatable around a common second axis.

7. A device as claimed in claim 1, wherein the portioning tool is a displacement element for generating a constriction in the string of material.

8. A device as claimed in claim 1, wherein the portioning tool is a separation element for cutting off the sections.

9. A device for portioning a string of material moving in a conveying direction into individual sections of a predetermined length, comprising at least one portioning tool rotatable in a circular path around an axis in a manner that the portioning tool can be moved transversely to the conveying direction into the string of material and out of the string of material and that the portioning tool follows the movement in the conveying direction in a limited manner, and wherein a plurality of portioning tools are arranged on a carrier, with one of the carrier or the portioning tools being rotatable around the axis, wherein each of the portioning tools comprises one of a displacement element for displacing the material in the string and a separation element for separating the string into the individual sections.

10. A method of portioning a string of material moving in a conveying direction into individual sections of a predetermined length, comprising:

rotatably driving at least one portioning tool in a circular path around an axis in a manner that the portioning tool is moved transversely to the conveying direction into the string of material and out of the string of material and follows the movement of the conveying direction in a limited manner, wherein the portioning tool comprises one of a displacement element for displacing the material in the string and a separation element for separating sections of the string, rotating the portioning tool in a circular path around a first axis and in a further circular path around a second axis, arranging the first and the second axis at a distance to each other, and controlling the rotary movements around the first and around the second axis independent of one another.

11. A method as claimed in claim 10, and providing a plurality of portioning tools which are rotatable both around their own axis and in predetermined angular distances with respect to each other around a common axis, wherein the rotary movements of a respective portioning tool around its own axis is controllable independent of the rotary movement of another portioning tool around its own axis.

* * * * *

UNITED STATES PATENT AND TRADEMARK OFFICE
CERTIFICATE OF CORRECTION

PATENT NO. : 7,479,058 B2  
APPLICATION NO. : 11/512606  
DATED : January 20, 2009  
INVENTOR(S) : Manfred Bachtle et al.

It is certified that error appears in the above-identified patent and that said Letters Patent is hereby corrected as shown below:

<u>On the Title Pg:</u>

Item (73), "Maschinenf Abrik" should be -- Maschinenfabrik --.

Item (30), "05020825" should be -- 05020825.5 --.

Item (74), "Gernstein" should be -- Gerstein --.

Signed and Sealed this

Twenty-sixth Day of May, 2009

JOHN DOLL  
*Acting Director of the United States Patent and Trademark Office*